UNITED STATES PATENT OFFICE 2,193,281

MILK OF MAGNESIA

Ralph E. Hall, Mount Lebanon, Pa., assignor to Hall Laboratories, Inc., Pittsburgh, Pa., a corporation of Pennsylvania No Drawing. Application July 9, 1937,
Serial No. 152,756

3 Claims. (Cl. 167—72)

This invention relates generally to milk of magnesia, and more particularly to milk of magnesia having a decreased tendency to coagulate or flocculate upon standing. Milk of magnesia upon standing has a tendency to coagulate or flocculate forming curds which gum up the container and make it difficult to screw the top on to a bottle containing the product. Another objection is that the magnesia has a tendency to separate from the water and settle to the bottom of the container making it necessary to shake the container before the product is poured in order to insure that the correct amount of the product is used.

I have found that these disadvantages may be overcome by adding an alkali-metal tripolyphosphate to the milk of magnesia. The alkali-metal tripolyphosphate is preferably used in an amount which is less than that necessary to react with all of the magnesia present. The tripolyphosphate may be used, for example, in an amount constituting about one-half percent based on the weight of the magnesia present. The tripolyphosphate decreases the viscosity of the milk of magnesia, deflocculating it and maintaining it in a more fluid condition so that it does not settle as rapidly or become sticky or tend to clog up the neck of the bottle.

The alkali-metal tripolyphosphates are chemical compounds of the formula $M_5P_3O_{10}$ in their anhydrous form, in which M represents an alkali-metal. Sodium tripolyphosphate is the most common and important of the alkali-metal tripolyphosphates and is the one which I prefer to employ. Chemical and X-ray analyses show that the sodium tripolyphosphate is a definite chemical compound which is distinct from both sodium metaphosphate and sodium pyrophosphate and that it is not a mixture of the two. Sodium tripolyphosphate is fusible and may be solidified by very rapidly cooling in a glassy amorphous form. Under slower cooling it solidifies in the form of crystals. The glass may be converted into crystal form by annealing. Sodium tripolyphosphate forms a crystalline hydrate of the general formula $Na_5P_3O_{10}.6H_2O$. Sodium tripolyphosphate is colorless, appearing white in the granulated crystalline form. When crushed it forms a free-flowing granular mass. By suitable precautions it may be produced in a mass which readily disintegrates into its constituent fine crystals. Sodium tripolyphosphate is not deliquescent and particularly in its hydrated form may be preserved indefinitely in ordinary atmospheres without caking or picking up moisture. Sodium tripolyphosphate is readily water-soluble in both its glassy and crystalline forms.

Sodium tripolyphosphate has several advantages over sodium hexametaphosphate as an addition to milk of magnesia. Sodium tripolyphosphate, in dilute solutions, produces an alkalinity which is substantially the same as the alkalinity of milk of magnesia. It is, therefore, unnecessary in using sodium tripolyphosphate in milk of magnesia to add any alkaline material such as would be the case where sodium hexametaphosphate is added to the milk of magnesia. Furthermore, sodium tripolyphosphate is more stable in alkaline solutions than is sodium hexametaphosphate, which tends to revert more rapidly to the orthophosphate than does sodium tripolyphosphate. Sodium tripolyphosphate is not hygroscopic and therefore can be manufactured, stored and packaged without danger of caking. It can be readily prepared in free-flowing crystalline form by relatively slow cooling after fusion as compared with the drastic chilling which is necessary in the preparation of sodium hexametaphosphate which is a glassy substance.

While I have described my invention with particular reference to sodium tripolyphosphate, since this is the cheapest and most usual tripolyphosphate, the tripolyphosphates of the other alkali-metals may be employed.

Although I have described, by way of example, the preferred material and the proportions which I prefer to employ, the invention is not so limited, but may be otherwise embodied within the scope of the following claims.

I claim:

1. Milk of magnesia containing an alkali-metal tripolyphosphate in an amount sufficient to act effectively as a dispersing agent and to prevent the milk of magnesia from forming curds which gum up the container.

2. Milk of magnesia containing sodium tripolyphosphate in an amount sufficient to act effectively as a dispersing agent and to prevent the milk of magnesia from forming curds which gum up the container.

3. Milk of magnesia containing about ½% of an alkali-metal tripolyphosphate based on the weight of the magnesia present.

RALPH E. HALL.